United States Patent [19]
Kullick et al.

[11] Patent Number: 5,764,992
[45] Date of Patent: Jun. 9, 1998

[54] METHOD AND APPARATUS FOR AUTOMATIC SOFTWARE REPLACEMENT

[75] Inventors: Steven Kullick, Saratoga; Diane Titus, Santa Clara, both of Calif.

[73] Assignee: Apple Computer, Inc., Cupertino, Calif.

[21] Appl. No.: 471,659

[22] Filed: Jun. 6, 1995

[51] Int. Cl.$^6$ ..................................................... G06F 9/45
[52] U.S. Cl. ................................................................ 395/712
[58] Field of Search ............................ 395/700, 650, 395/621, 622, 712

[56] References Cited

U.S. PATENT DOCUMENTS

| | | | |
|---|---|---|---|
| 5,019,963 | 5/1991 | Alderson | 395/600 |
| 5,155,847 | 10/1992 | Kirouac | 395/600 |
| 5,247,683 | 9/1993 | Holmes | 395/700 |
| 5,473,772 | 12/1995 | Halliwell | 395/650 |
| 5,564,051 | 10/1996 | Halliwell | 395/600 |
| 5,608,901 | 3/1997 | Letwin | 395/621 |

*Primary Examiner*—James P. Trammell
*Assistant Examiner*—Peter J. Corcoran, III
*Attorney, Agent, or Firm*—Burns, Doane, Swecker & Mathis, L.L.P.

[57] ABSTRACT

A software program running on a computer automatically replaces itself with a newer version in a completely automated fashion, without interruption of its primary function, and in a manner that is completely transparent to the user of the computer. This is achieved by means of a logic module that is incorporated into programs. The logic module performs the functions of locating and identifying other versions of its associated program, determining whether the other versions are older or newer than the currently running version, and replacing older versions of itself with a newer version. As part of this operation, the logic module can copy the newer version to its current location, move the older version to a secondary location, and remove older versions of itself that have been replaced by a newer version. The new version that is to replace an older version can reside on an individual computer, or can be present on a server to which a number of computers are connected via a network. With this arrangement, software upgrades can be effected in an efficient and automatic manner, without resort to any external resources.

30 Claims, 4 Drawing Sheets

METHOD AND APPARATUS FOR AUTOMATIC SOFTWARE REPLACEMENT

FIELD OF THE INVENTION

The present invention is directed to networked computer systems, and more particularly to a method and apparatus for automatically updating software programs that reside on computers, such as client computers in networked systems.

BACKGROUND OF THE INVENTION

One of the primary factors that contributes to the value of a computer is its ability to perform a wide range of useful, often unrelated, functions. Each of these functions requires the installation of a set of software instructions, commonly referred to as program, onto a storage device of the computer before the desired function can be performed. Over time, modifications are typically made to the instructions in a program, for example to correct mistakes in the program, to modify its features, or to accommodate changes made to the hardware and/or operating system of the computer. Each time an updated version of a program with a revised set of modifications is made available for use, it is typically labeled with a unique identifier, such as a new version number. Each computer user who receives an updated version of a program has the responsibility to see that it is properly installed and configured on all computers where it is to be used. Often, the user is required to ascertain for himself or herself that a new version of a program of interest exists, and thereafter obtain a copy of the new version. In situations where a large number of copies of the program are required to be updated, such as in a network environment, the task of updating all copies of the program can prove to be both cumbersome and time consuming.

In the past, efforts have been made to automate the process of upgrading software programs as new versions become available. For example, in a network environment, it is possible to send an electronic mail message to all users on the network that a new version of a program is available. In this case, however, the individual users are required to download and install the new software themselves, when and if the upgrade is desired. For those users who are not familiar with the procedures necessary to retrieve and/or install the software, the installation may end up being faulty, inadequate or delinquent. In such situations, support from a network administrator or the like may be required. This can be particularly difficult in an organization where a small number of personnel are required to provide support to a large number of users. Consequently, uniform and timely software upgrades in an organization of any appreciable size can be difficult or impossible to achieve.

Even where automated upgrade mechanisms have been made available in the past, they were limited to network-based independent programs that attempted to affect changes to software modules that were identified by a network administrator, based on a set of rules. To be effective, these approaches required significant maintenance of the rule set by the administrator, adding complexity and overhead to the process. In addition, since these operations were external to the software being updated, they required interruption of the operation of the software before the updating could take place. The user often had no control over when an update occurred. Furthermore, since they exerted external control, security issues were raised. For example, an active operation that has access to a large number of computers, such as an external updating program, provides a path via which a virus or a hacker can invade the computer system.

Accordingly, it is desirable to provide a mechanism by which software programs can be automatically updated in an easy and effective manner without concerns over security issues that are raised by external access requirements.

BRIEF STATEMENT OF THE INVENTION

In accordance with the present invention, this objective is achieved by means of a method and apparatus that permits a software program running on a computer to automatically replace itself with a newer version in a completely automated fashion, without interruption of its primary function, and in a manner that is completely transparent to the user of the computer. These results are achieved by means of a logic module that is incorporated into programs. The logic module performs the functions of locating and identifying other versions of its associated program, determining whether the other versions are older or newer than the currently running version, and replacing older versions of itself with a newer version. As part of this operation, the logic module can copy the newer version to its current location, move the older version to a secondary location, and remove older versions of itself that have been replaced by a newer version. The new version that is to replace an older version can reside on an individual computer, or can be present on a server to which a number of computers are connected via a network. With this arrangement, software upgrades can be effected in an efficient and automatic manner from within the programs themselves, and therefore, without resort to any external resources.

Further features of the invention, and the advantages offered thereby, are explained in greater detail hereinafter with reference to specific embodiments illustrated in the accompanying drawings.

DETAILED DESCRIPTION

To facilitate an understanding of the principles and features of the present invention, it is explained hereinafter with reference to its implementation in an illustrative embodiment. In particular, the invention is described in the context of one type of networked computer system. It will be appreciated, however, that this is not the only embodiment in which the invention can be implemented. Rather, it can find utility in a variety of computer configurations, as will become apparent from an understanding of the principles which underlie the invention.

Figure 1:
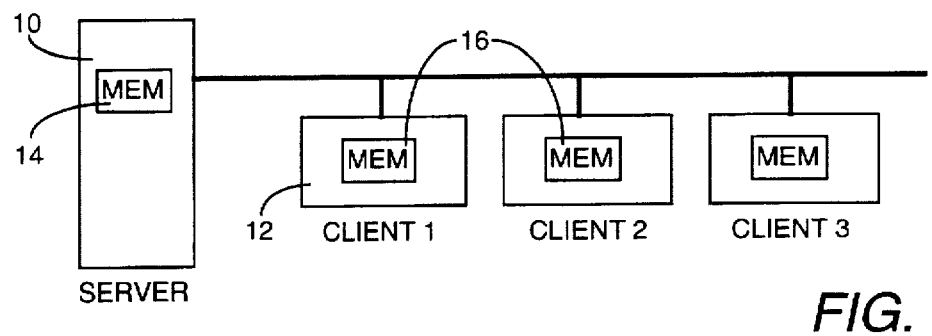
FIG. 1 is block diagram of a computer network.

An example of a computer network of the type in which the present invention might be implemented is illustrated in block diagram form in FIG. 1. The structure and arrangement of the computers in which the invention is embodied, as well as the overall architecture of the network, do not form part of the invention itself. Rather, they are briefly described herein to facilitate an understanding of the manner in which the invention cooperates with various components of such a computer system. Referring to FIG. 1, a typical computer network might comprise at least one server computer 10 that is connected to a number of client computers 12 via a suitable transmission medium, such as coaxial cable, telephone wire, wireless rf links, or the like. Communications between the server 10 and each of the various client computers 12 takes place by means of an established protocol, such as Ethernet, for example. Among other resources that it provides, the server 10 includes a shared memory area 14, which might comprise a predetermined sector or directory on a hard disk drive or other form of nonvolatile memory. Each of the client computers 12 has access to the shared memory area, as a result of which they can read information stored therein, and download it to their respective local memories 16. Depending upon the particular configuration of the network, some or all of the client computers 12 may also have the ability to write information to the shared memory area 14.

The local memories 16 of the respective client computers store the various software programs that run on the computers. These stored programs might include an operating system, which controls the basic operations of the computer, as well as one or more applications programs that users employ to perform desired tasks, such as word processing, drawing, painting, communications, and the like. Over time, each of these various types of programs may be rewritten by their developers to provide additional functionality, correct errors, and/or accommodate new equipment that has become available to the user. When this occurs, the users must upgrade the software programs, i.e. replace the older versions stored in their computers' memories with a newer version to avail themselves of the new features.

In accordance with the present invention, the upgrading of programs stored in the memories of the client computers is carried out automatically in a manner that is transparent to the users of the computers and without interruption to the normal operation of the programs. Generally, this result is achieved by storing upgrade versions of the programs in the shared memory area 14 of the server computer 10. Whenever a program is launched or started on any of the client computers, it checks the shared memory area to determine whether an upgrade version is present, and if so whether that version is more recent than the version of the program itself. If so, the program downloads a copy of the newer version to the memory 16 of the client computer, and then replaces the current version that is starting with the newer version. Since this procedure takes place as part of the start up process, it does not interrupt the normal operation of the program while it is running. Furthermore, it is transparent to the user. Of particular significance, control of the updating procedure takes place from within the program itself, so that no external mechanisms are required to implement the automatic updating function.

Figure 2:
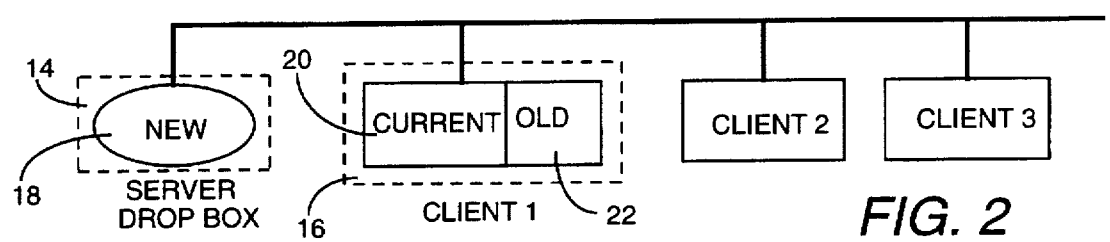
FIGS. 2–9 are sequence diagrams which depict the steps in the operation of automatically updating a software program stored on a computer in a network.

The updating process is explained in greater detail hereinafter with reference to sequence diagrams illustrated in FIGS. 2-9, and the flowchart of FIG. 10. For ease of understanding, the sequence diagrams of FIGS. 2-9 illustrate only the memory portions 14 and 16 of the server and client computers, respectively. Referring to FIG. 2, the shared portion of the server's memory 14 includes a designated area, i.e. range of addresses, that is referred to as a "drop box" 18. Whenever a new version of a program is to be made available to the client computers on the network, it is stored in this portion of the shared memory. The memory 16 of each client computer has two designated areas 20 and 22. Area 20 holds the current versions of programs that run on the computer. Thus, whenever a program is launched, it is loaded from this area into the main memory, i.e. RAM, of the computer. The area 22 is used to store old, or stale, versions of programs that have been updated, prior to the time that they are deleted from memory. The area 22 can be on the same storage medium as the area 20, for example a different directory or folder on a hard disk drive, or it could be present in a different medium, such as a backup or secondary drive.

In accordance with the present invention, programs that are stored in the current area 20 of the computer include a logic module which implements the automatic update function. It is not necessary that every program stored in the area 20 include such a module. Rather, it may only be desirable to incorporate such a module into those programs that are likely to be updated during the anticipated life of the computer. Typically, such programs might include the operating system software, most application programs, and some device drivers. Preferably, the logic module is incorporated into the structure of the boot routine for each program that is to be updated.

Figure 3:
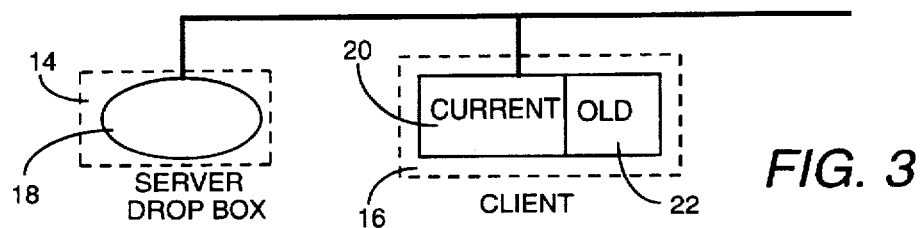
Figure 4:
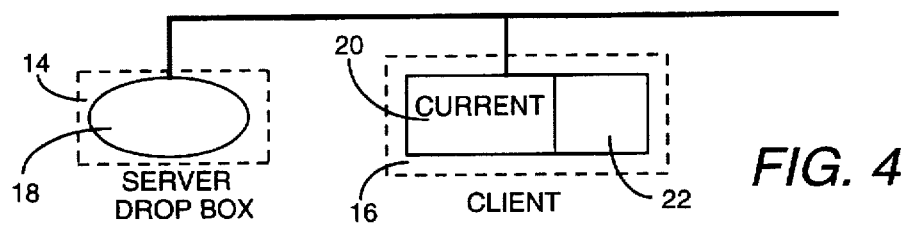

The operation of the logic module is explained with reference to the flow chart of FIG. 10, as well as FIGS. 3-9, which depict the contents of the memory areas 18, 20 and 22 at various stages of the process. Referring to FIG. 10, the process of the present invention begins when a program is launched, or stored, in a client computer from the area 20 of the memory (Step 24). As part of the launch process, at Step 26 the program checks whether an old, or stale, version of itself is currently stored in the area 22 of the memory, as shown in FIG. 3. The manner in which an old version is placed in this area of the memory will become apparent from the following description. If there is an old version present, it is removed from memory at Step 28, as depicted in FIG. 4.

Figure 5:
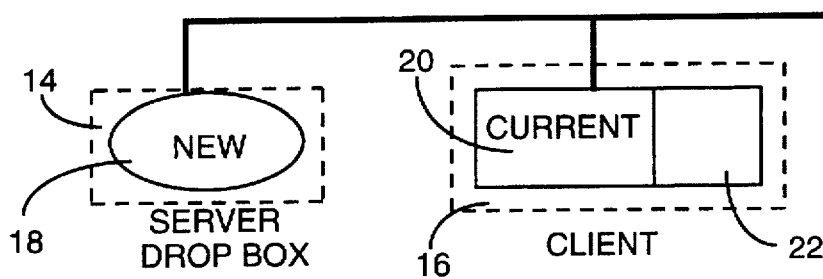

Once the old version has been deleted at Step 28, or if there was no old version present in the area 22 of the memory, the logic module proceeds to Step 30, where it checks whether a version of the program is currently stored in the drop box 18 of the server's memory 14. This program might be stored in the drop box of the server by a system administrator, or the like, whenever an upgraded version of the program becomes available. If there is none, the program continues with the remainder of the launch process at Step 32, and operates as normal. If, however, there is a version of the program stored in the drop box, as depicted in FIG. 5, the logic module proceeds to Step 34, where it determines whether the version stored in the drop box is newer than the current version stored in the area 20 of the client computer's memory. This determination can be made through any suitable technique. For example, each new version of a program is typically labeled with a successively higher version number than the previous version. Thus, at Step 34, the version number of the current version can be compared with the version number of the program stored in the drop box 18, to determine which is higher, and therefore newer. Alternatively, or in addition, each version might have a date and time stamp associated with it, from which the newest version can be readily determined.

Figure 6:
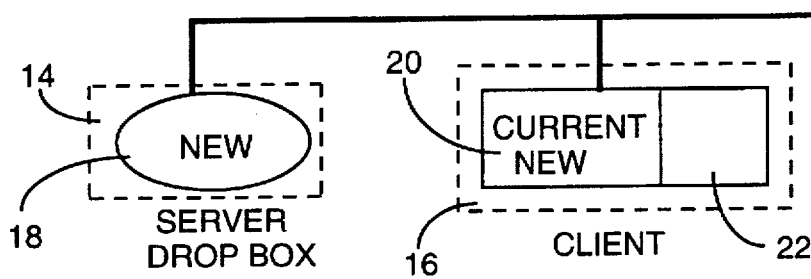
Figure 7:
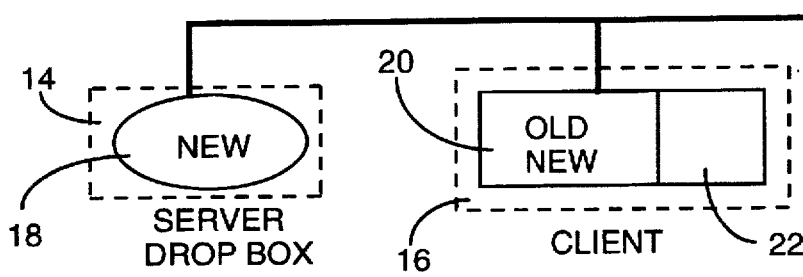

If a determination is made at Step 34 that the version stored in the drop box 18 is the same as, or older than, the current version in the memory area 20, no further action is taken and the program continues with its normal launch routine at Step 32. If, however, the version present in the drop box 18 is newer than the current version, the new version is copied to the area 20 at Step 36, as shown in FIG. 6. As part of the copying process, the new version can be stored in the area 20 with a modified name that identifies it as the new version, to prevent a possible conflict with the current version that is running.

Figure 8:
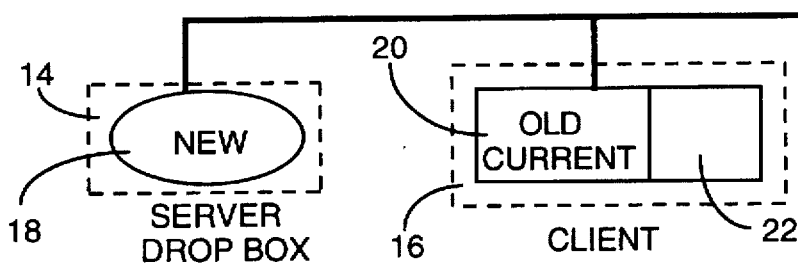
Figure 9:
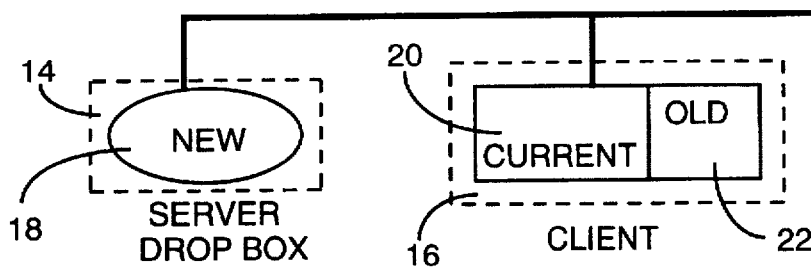

Thereafter, the current version is renamed in a manner that identifies it as the stale version of the program (Step 38, FIG. 7), and the new version of the program is given the unmodified name of the executing code (Step 40, FIG. 8). Finally, the stale version of the program is moved to the area 22 in the memory of the client computer, at Step 42, and the launch process continues as normal at Step 32.

In the preceding example, the old version of the program is moved to the area 22, where it is removed from memory the next time the program is launched. This particular approach is designed for those computers which do not permit a currently executing program to be removed from memory. In addition, it may be desirable to keep the old version of program in memory, in the event that there was a problem in the transfer of the new version to the client computer that interferes with the proper operation of the new version. However, if a computer permits a currently executing version of a program to be deleted from memory, and there is no desire to maintain the old version once the new version has been copied into the memory, the old version can be directly removed from memory as part of the process, rather than move it to another area and then delete it on a subsequent launch.

Figures 10, 11:
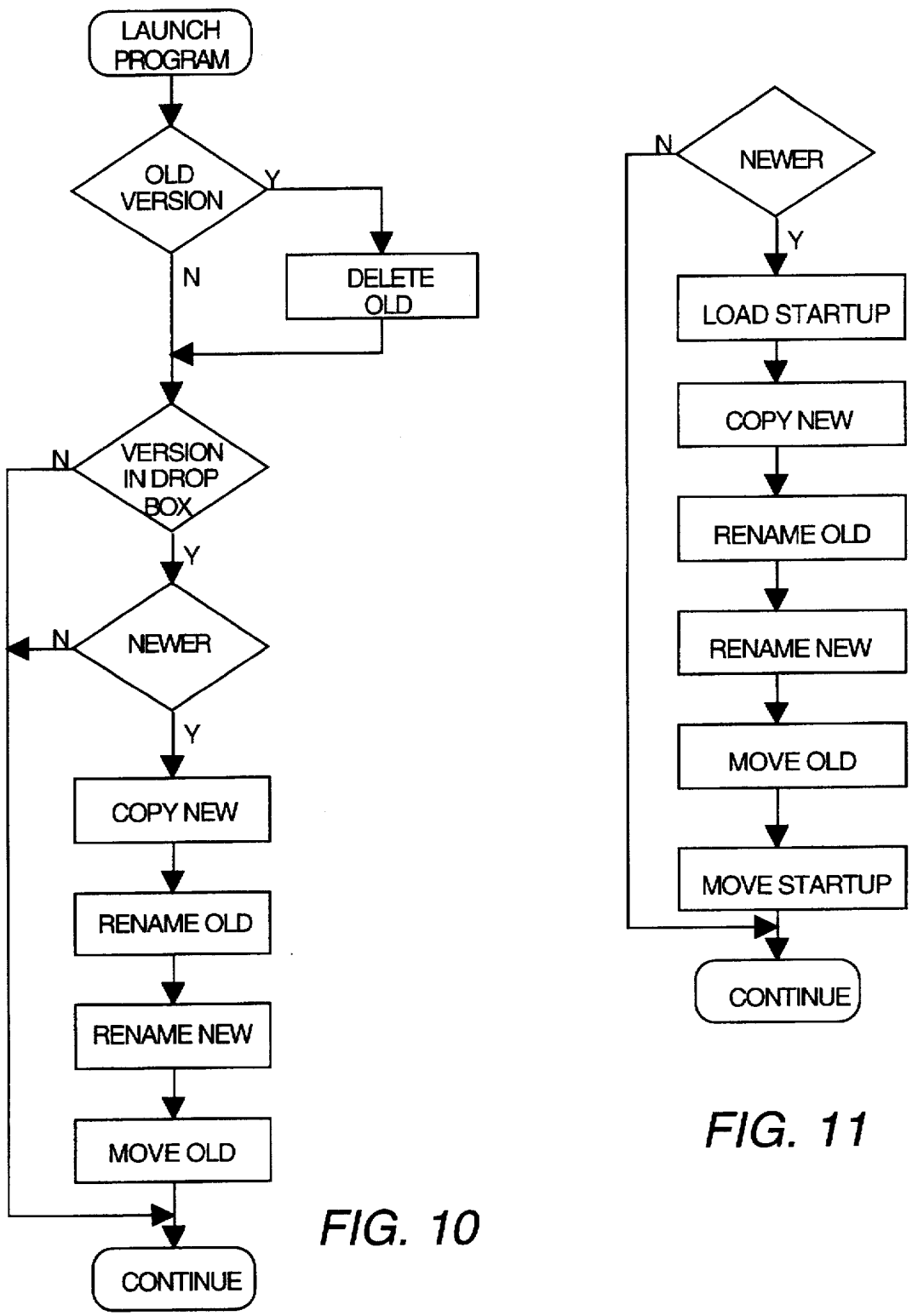
FIG. 10 is a flowchart of the process depicted in FIGS. 2–9.
FIG. 11 flowchart of an alternate embodiment.

An alternative embodiment of the invention is illustrated in the flowchart of FIG. 11. This embodiment is directed to the possibility that the power to the computer is interrupted during the time between the renaming of the current version as a stale version, at Step 38, and the renaming of the new version to the current name, at Step 40. If the power should be interrupted during this period of time, there is no version of the software which is identified as the current version. Rather, only the stale version and a new version exist. Although this situation is not particularly problematic for application programs, since the user would likely be able to tell which version stored on the local computer is the newer version, it may be desirable to take precautions that prevent such a situation from occurring.

To this end, in the modified embodiment of FIG. 11, the ability to automatically execute a program upon startup of the computer is utilized. Referring to FIG. 11, after the determination is made at Step 34 that a newer version of the currently executing program is available for downloading, at Step 35 a startup routine is temporarily loaded into a region where it is automatically executed upon startup of the computer. For example, in the Macintosh operating system, a startup folder is accessible by users and other software programs. When the computer is started, the operating system attempts to execute or launch any files that reside in the startup folder. In other words, these files are the first applications to be executed upon starting the machine. In other types of operating systems, a script file or a batch file might be automatically executed upon computer startup. For example, in computers which run on the DOS operating system, any commands placed in the AUTOEXEC.BAT file are automatically executed upon startup.

After copying the startup routine into the appropriate location, the program continues in the normal manner to download the new version of the program at Step 36, rename the old and new versions at Steps 38 and 40, respectively, and then move the old version to the stale area at Step 42. If all of these steps are successfully completed, the startup routine is removed to the stale area at Step 43, where it is deleted along with the old version of the program, for example at Step 28, the next time it is launched.

Figure 12:
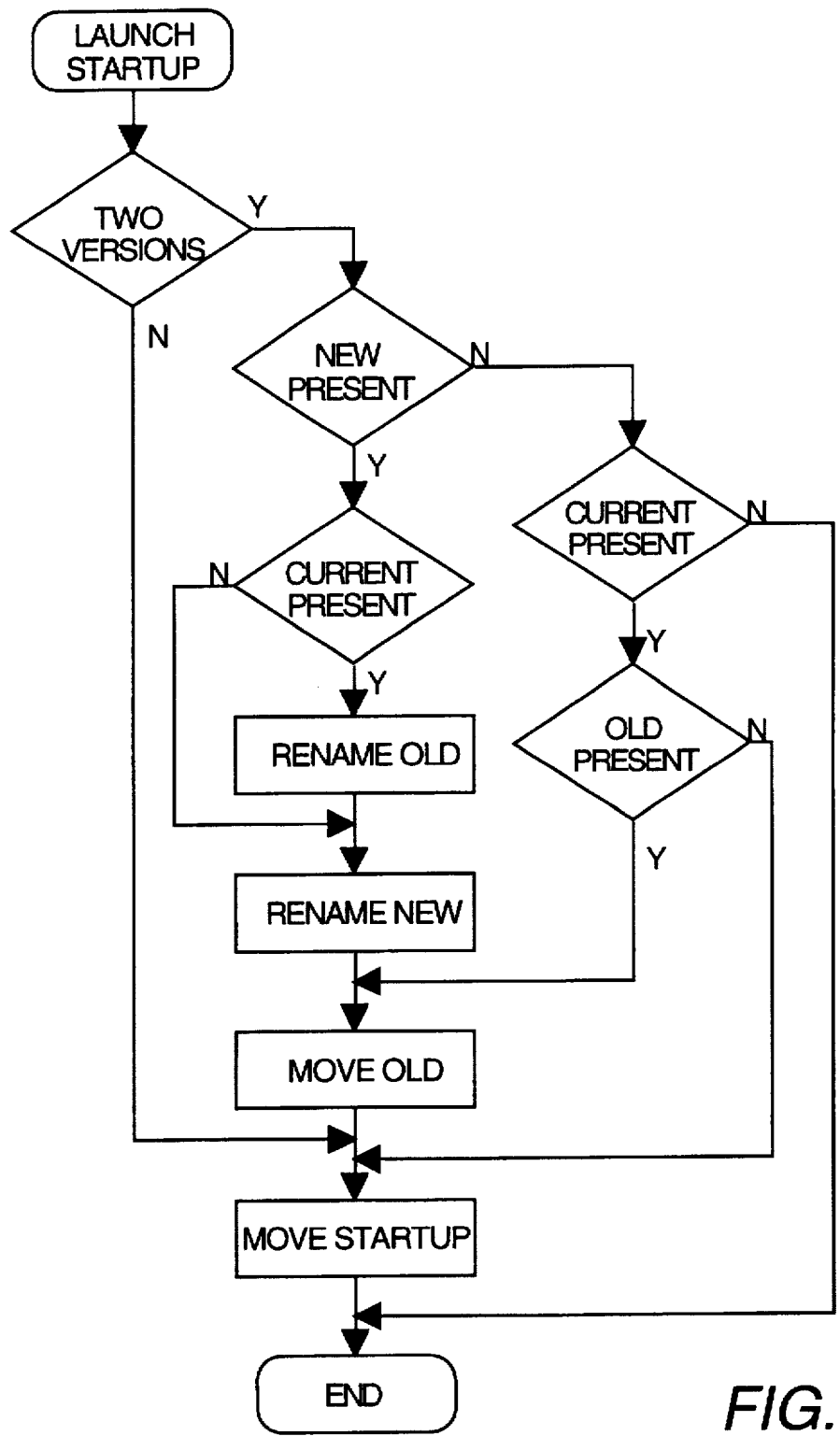
FIG. 12 is a flowchart of the operation of the startup routine.

If, however, Steps 36-42 are not successfully completed, the startup routine will be present in the startup folder, or equivalent location, the next time the computer boots up. In this case, the startup routine will automatically execute. The procedures carried out by this routine are illustrated in the flowchart of FIG. 12. Upon being launched, the routine first determines whether two versions of a program are stored in the current area. If so, there are four possible situations that can be the safest approach is to simply delete the new version, at Step 44, and repeat the update process the next time the program of interest is launched. The startup routine then moves itself to the stale program removal area 22 at Step 46, so that it will be deleted upon the startup of the program of interest.

In the second possible situation, the first rename step has been completed, but the second has not. In other words, the new and old program versions are present, but there is no current version as in FIG. 7. In this case, the startup routine renames the new program as the current program (Step 48), and then moves the old program to the stale program removal area 22 at Step 50. After doing so, the startup routine moves itself to the stale program removal area at Step 46.

In the third situation, both versions of the program have been renamed. i.e. Steps 38 and 40 are completed, but the removal of the old program to the stale program removal area 22 has not yet occurred, as in FIG. 8. In other words, two versions of the program are still present in the current area. In this case, the startup routine moves the old program to the stale program removal area 22, at Step 50, and then moves itself to this area at Step 46.

In the fourth possible situation, each of Steps 38, 40 and 42 has been completed, but the startup routine itself is still present in the startup folder. This might occur if the loss of power occurs between Steps 42 and 43 of FIG. 11. In such a case, there is only one version of the program of interest in the memory area 20, which is detected at Step 52. The startup routine moves itself to the stale code removal area, at Step 46, so that it will be deleted upon the next launch of the program.

The startup routine continues to attempt completion of the rename steps and, once successful, it removes itself to the stale program removal area 22. Since the startup routine is copied to the startup folder before any renaming of the program versions, an interruption of power to the computer will always be followed by a restart, as a result of which the renaming operations are executed before the user has access to the computer.

From the foregoing, it can be seen that the present invention provides automatic upgrading of programs by means of software logic that resides within the programs themselves, thereby eliminating the need for any external code or other mechanisms. Each program that updates itself follows a fixed set of rules and limits, and therefore security concerns are greatly reduced, if not eliminated altogether. In addition, the need for system administration overhead is significantly minimized.

It will be appreciated by those of ordinary skill in the art that the present invention can be embodied in other specific forms without departing from the spirit or essential characteristics thereof. For example, the invention has been described in the context of a networked computer system, in which the new version of the program is downloaded from the central, shared memory when the current version is launched. The particular time at which the download takes place is not critical, however. For example, the downloading can take place in a background operation that is executed after the launch process is complete. Alternatively, the downloading can occur when the user quits the current program.

The presently disclosed embodiments are therefore considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A method for automatically updating software programs on a computer, comprising the steps, of:
   storing an updated version of a program at a designated location in a remote memory that is accessible to the computer;
   launching a current version of the program that is stored in memory of the computer, wherein said current version carries out the following steps independent of functions performed by any resource external to said current version:
   detecting whether a version of the program is stored in the designated location;
   determining whether a detected version of the program stored at the designated location is more recent than the current version of the program which is running;
   replacing the current version of the program with a more recent version that is stored at the designated location; and
   subsequently executing the more recent version of the program on the computer.

2. The method of claim 1, wherein said replacing step comprises the steps of:
   copying the more recent version of the program from said designated location to an area of the computer's memory in which the current version of the program is stored;
   renaming the current version of the program to identify it as a stale version; and
   moving the renamed version of the program to an area of memory outside of the area where the more recent, copied version of the program is stored.

3. The method of claim 2 further including the steps of naming the copied version of the program with a name that is different from the current version of the program prior to renaming the current version, and renaming the copied version of the program with the original name of the current version after the current version has been renamed.

4. The method of claim 2 further including the steps of detecting whether a stale version of the program is stored in said outside memory area as part of the launch process, and deleting any detected stale version from said memory area.

5. The method of claim 4 wherein said detecting and deleting steps are carried out prior to the detection of whether a version of the program is stored in the designated location.

6. The method of claim 2 further including the step of loading a startup routine in an area of the computer's memory which causes said routine to be automatically executed upon startup of the computer, prior to said copying step, and removing the startup routine from said area upon successful completion of said moving step.

7. The method of claim 6 wherein said startup routine functions upon execution to detect whether two versions of the program are located in a predetermined area of the computer's memory, and if so to move one of said versions to said outside memory area and to label the other version as the current version of the program.

8. The method of claim 7 wherein said startup routine moves itself to said outside area upon completing said moving and labelling steps.

9. The method of claim 1 wherein said detecting, determining and replacing steps take place as part of the launch process.

10. The method of claim 1 wherein said detecting, determining and replacing steps are carried out as a background process by the program after it has launched.

11. The method of claim 1 wherein said detecting, determining and replacing steps are carried out as part of a shut-down routine for the program.

12. A system for automatically updating software programs stored on a computer, comprising:
   a first memory location that is accessible to the computer, for storing updated version of software programs, wherein said first memory is remotely located with respect to the computer;
   a second memory location for storing current versions of software programs to be executed on the computer; and
   a logic module incorporated in at least some of said software programs, said logic module including means for detecting whether an updated version of the program in which said module is incorporated is stored in said first memory location, and means for replacing the current version of the program with the updated version that is stored at said first memory location,
   wherein said means for replacing the current version of the program includes:
   i. means for copying the updated version of the program from said first memory location to said second memory location,
   ii. means for renaming the current version of the program to identify it as a stale version, and
   iii. means for moving the renamed version of the program to a third memory location.

13. The system of claim 12 wherein said logic module further includes means for determining whether a version of the program stored at said first memory location is more recent than the current version of the program stored in said second memory location, and for actuating said replacing means only if the version in said first memory location is more recent.

14. The system of claim 12 wherein said computer is a client on a computer network that includes a server computer, and wherein said first memory location is part of a memory that is accessible to all client computers on the network, and said second memory location is a part of a local memory for the client computer.

15. The system of claim 14 wherein said replacing means includes means for copying the updated version of the program from said first memory location to said second memory location, means for renaming the current version of the program to identify it as a stale version, and means for moving the renamed version of the program to a third memory location.

16. The system of claim 15 wherein said third memory location is a part of the local memory for the client computer.

17. A computer-readable storage medium having stored therein a program which executes the steps of:
   detecting whether another version of the program is present in a memory that is accessible to said program, wherein the accessible memory is remotely located with respect to the computer-readable storage medium;
   determining whether a detected version of the program is more recent than said program; and
   replacing itself with a more recent version of the program, wherein said replacing step includes the steps of:
   i. copying the more recent version of the program from said accessible memory to a predetermined storage area in which the current version of the program is stored.

ii. renaming the currently executing version of the program to identify it as a stale version, and iii. moving the renamed version of the program to a storage area outside of the area where the more recent, copied version of the program is stored.

18. The storage medium of claim 17 wherein said program executes the further steps of naming the copied version of the program with a name that is different from the currently executing version of the program prior to renaming the currently executing version, and renaming the copied version of the program with the original name of the currently executing version after the currently executing version has been renamed.

19. The storage medium of claim 17 wherein said program executes the further steps of detecting whether a stale version of the program is stored in said outside storage area as part of its launch process, and deleting any detected stale version from said storage area.

20. The storage medium of claim 19 wherein said detecting and deleting steps are carried out prior to the detection of whether a version of the program is stored in the accessible memory.

21. The storage medium of claim 17 wherein said program executes the further steps of loading a startup routine in an area of a computer's memory which causes said routine to be automatically executed upon startup of the computer prior to said copying step, and removing the startup routine from said area upon successful completion of said moving step.

22. The storage medium of claim 21 wherein said startup routine functions upon execution to detect whether two versions of the program are located in a predetermined area of the computer's memory, and if so to move one of said versions to said outside memory area and to label the other version as the currently executing version of the program.

23. The storage medium of claim 22 wherein said startup routine moves itself to said outside area upon completing said moving and labelling steps.

24. The storage medium of claim 17 wherein said detecting, determining and replacing steps take place as part of the launch process for said program.

25. The storage medium of claim 17 wherein said detecting, determining and replacing steps are carried out as a background process by the program after it has launched.

26. The storage medium of claim 17 wherein said detecting, determining and replacing steps are carried out as part of a shut-down routine for the program.

27. A computer network comprising:

a first computer;

a first memory module containing a current version of a software application program;

a second memory module, wherein said first computer includes means for downloading an updated version of the software application program into said second memory module; and a second computer having access to said first and said second memory modules, said second computer includes processing means for executing the current version of the software application program stored in said first memory module, wherein the current version of the software application program comprises:

i. means for determining whether said second memory module contains an updated version of the software application program, and ii. means for replacing the current version of the software application program by the updated version if an updated version has been stored in said second memory module.

28. The computer network of claim 27, wherein said means for replacing the current version of the software application program comprises:

means for copying the updated version of the software application program from said second memory module to a predetermined location in said first memory module;

means for renaming the current version of the software application program so as to identify it as a stale version; and means for moving the renamed version of the software application program to a third memory module.

29. The computer network of claim 28, wherein said first memory module is incorporated in said second computer.

30. The computer network of claim 28, wherein said first computer is a server computer and wherein said second computer is a client computer.

* * * * *